United States Patent
Saleh et al.

(10) Patent No.: US 8,860,956 B2
(45) Date of Patent: Oct. 14, 2014

(54) SPECTROMETRY EMPLOYING EXTINCTION COEFFICIENT MODULATION

(71) Applicant: International Business Machines Corporation, Armonk, NY (US)

(72) Inventors: Nedal R. Saleh, Santa Clara, CA (US); Yunlin Zhang, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/836,111

(22) Filed: Mar. 15, 2013

(65) Prior Publication Data

US 2014/0268181 A1   Sep. 18, 2014

(51) Int. Cl.
*G01B 11/28* (2006.01)
*G01B 11/00* (2006.01)

(52) U.S. Cl.
CPC .................................. *G01B 11/00* (2013.01)
USPC .......................................................... 356/630

(58) Field of Classification Search
CPC .................... G01B 11/0625; G01B 11/0683
See application file for complete search history.

(56) References Cited

U.S. PATENT DOCUMENTS

| | | | |
|---|---|---|---|
| 6,912,056 B2 * | 6/2005 | Hyun et al. | 356/630 |
| 7,259,850 B2 | 8/2007 | Ke et al. | |
| 7,289,234 B2 | 10/2007 | Finarov | |
| 7,667,858 B2 | 2/2010 | Chard et al. | |
| 8,062,910 B1 | 11/2011 | Feng et al. | |
| 2005/0041255 A1 * | 2/2005 | Hyun et al. | 356/504 |
| 2010/0045981 A1 | 2/2010 | Kikuchi | |
| 2011/0089348 A1 * | 4/2011 | Finarov et al. | 250/559.39 |
| 2012/0276815 A1 * | 11/2012 | David et al. | 451/5 |
| 2012/0278028 A1 * | 11/2012 | David et al. | 702/127 |

OTHER PUBLICATIONS

Vaid, et al., "Scatterometry as Technology Enabler for Embedded SiGe Process", SPIE Advanced Lithography 2008—Metrology, Inspection, and Process Control, Proc. of SPIE, vol. 6922 69220U-1.

* cited by examiner

*Primary Examiner* — Michael P Stafira
(74) *Attorney, Agent, or Firm* — Scully, Scott, Murphy & Presser, P.C.; Catherine Ivers, Esq.

(57) ABSTRACT

A method for decomposing design shapes in a design level into a plurality of target design levels is provided. Design shapes including first-type edges and second-type edges having different directions is provided for a design level. Inner vertices are identified and paired up. Vertices are classified into first-type vertices and second-type vertices. First mask level shapes are generated so as to touch the first-type vertices, and second mask level shapes are generated so as to tough the second-type vertices. Cut mask level shapes are generated to touch each first-type edges that are not over a second-type edge and to touch each second-type edges that are not over a first-type edge. Suitable edges are sized outward to ensure overlap among the various shapes. The design shapes are thus decomposed into first mask level shapes, the second mask level shapes, and the cut mask level shapes.

20 Claims, 9 Drawing Sheets

SPECTROMETRY EMPLOYING EXTINCTION COEFFICIENT MODULATION

BACKGROUND

The present disclosure relates to a spectrometry method for measuring a dimension in a film stack employing extinction coefficient modulation, and an apparatus for implementing the same.

Scatterometry is an optical model-based metrology technique used in semiconductor device manufacturing to monitor quality and compliance of device fabrication and to control process through automated process control. Scatterometry includes many types of optical metrology techniques such as ellipsometry, reflectometry, and varying angle scatterometry. A predictive database of optical diffractive signatures is developed prior to the measurement. Real-time diffraction signatures are compared with various models based on the predictive database to provide in-line measurement of device dimensions such as thickness of various layers.

In general, scatterometry solves an inverse-diffraction problem by searching the predictive database for a best fitting model that generates a diffraction signature similar to the measured diffraction signature from a real-time measurement target structure. One of the fundamental shortcomings of scatterometry is that a given diffraction spectrum could have come from various different shapes. This degeneracy is called correlation. In addition, some shape parameter variations can result is a minimal change in the diffraction signature, thereby providing an inherently large range for an estimated dimension provided by parameter fittings. This phenomenon is called parameter insensitivity Further, some applications of scatterometry such as measurement of thicknesses of various layers with varying strain doping or a semiconductor material overfill with multiple materials having similar diffraction signature do not provide a reliable process feedback method since such in-situ doping processes do not provide any mechanism for feed-forward. Adjacent layers with similar dispersion characters have parameters that are inherently difficult to measure because of lack of scatterometry sensitivity, and thus, any measurement results in a large uncertainty in calculated thicknesses. Such limitations permeate all types of scatterometry. Further, this problem is exacerbated in 3-dimensional applications in which non-planar structures are measured due to limited parameter ranges that limit sensitivity.

SUMMARY

Models for hypothetical material structures are derived from a model for a physical material stack that simulates a material layer stack from which at least one optical spectrum is measured by scatterometry. The hypothetical material structures include a material layer having a modulated extinction coefficient curve that is derived from an extinction coefficient curve of a physical layer by multiplication with a scalar. Modulation of the extinction coefficient curve can artificially enhance parameter sensitivity of a fitting algorithm to the thickness of the layer under extinction coefficient modulation. By interpolating or extrapolating calculated dimension determined at various values for the scalar to the condition at which the scalar becomes equal to unity, an estimation of the thickness of the material layer can be obtained with enhanced accuracy.

According to an aspect of the present disclosure, a method of measuring a dimension of a material layer in a material stack is provided. At least one optical spectrum is measured from a stack of material layers. A material stack model that approximates the stack of material layers employing a database including refractive index curves and extinction coefficient curves for a plurality of materials. A plurality of modulated extinction coefficient curves is generated by scaling an extinction coefficient curve, as acquired from the database, of a target material within the material stack model through multiplication of a plurality of scalars. For each selected modulated extinction coefficient curve among the plurality of modulated extinction coefficient curves, a data set representing an estimated dimension of one of the material layers is generated by fitting a modified material stack model to the at least one measured optical spectrum. The modified material stack model is derived from the material stack model by substitution of the selected modulated extinction coefficient curve for the extinction coefficient curve. A best-fit function is determined by fitting the data sets with a fitting function while employing the plurality of scalars as discrete values for a variable of the fitting function. A physical dimension of the one of the material layers is determined by selecting a value of the best-fit function corresponding to a value of 1 of the variable.

According to another aspect of the present disclosure, an apparatus for measuring a dimension of a material layer in a material stack is provided. The apparatus includes a measurement tool configured to measure at least one optical spectrum from a stack of material layers, and a computing device including one or more processors in communication with a memory and configured to run an automated program. The automated program includes steps of: (1) generating, upon receipt of data representing the at least one measured optical spectrum, a material stack model that approximates the stack of material layers employing a database including refractive index curves and extinction coefficient curves for a plurality of materials, (2) generating a plurality of modulated extinction coefficient curves by scaling an extinction coefficient curve, as acquired from the database, of a target material within the material stack model through multiplication of a plurality of scalars, (3) generating, for each selected modulated extinction coefficient curve among the plurality of modulated extinction coefficient curves, a data set representing an estimated dimension of one of the material layers by fitting a modified material stack model to the at least one measured optical spectrum, wherein the modified material stack model is derived from the material stack model by substitution of the selected modulated extinction coefficient curve for the extinction coefficient curve, (4) determining a best-fit function by fitting the data sets with a fitting function while employing the plurality of scalars as discrete values for a variable of the fitting function, and (5) estimating a physical dimension of the one of the material layers by selecting a value of the best-fit function corresponding to a value of 1 of the variable.

DETAILED DESCRIPTION

As stated above, the present disclosure relates to a spectrometry (scatterometry) method for measuring a dimension of a film in a film stack employing extinction coefficient modulation, and an apparatus for implementing the same. Aspects of the present disclosure are now described in detail with accompanying figures. It is noted that like and corresponding elements are referred to by like reference numerals. The drawings are not drawn to scale. Ordinals are employed merely to distinguish different steps or elements, and different ordinals may be employed across the specification and the claims.

Figure 1:
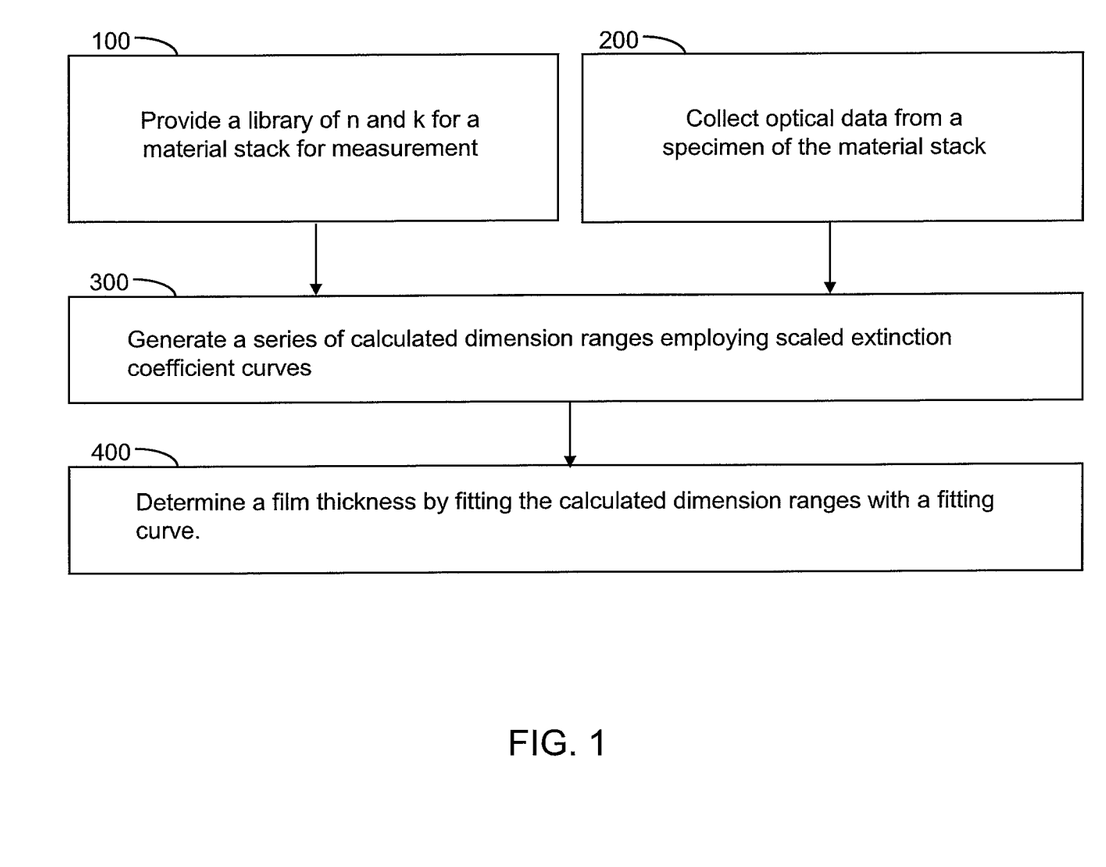
FIG. 1 is a flow chart illustrating steps for determining a film thickness employing extinction coefficient modulation according to an embodiment of the present disclosure.

Referring to FIG. 1, a flow chart illustrates steps for determining a film thickness employing extinction coefficient modulation according to an embodiment of the present disclosure.

Referring to step 100, a database for refractive index curves and extinction coefficient curves is provided. As used herein, a "refractive index curve" refers to any data set that characterizes the refractive index n of a material as a function of wavelength. As used herein, an "extinction coefficient curve" refers to any data set that characterizes the extinction coefficient k, i.e., the absorption coefficient, of a material as a function of wavelength. The range of the wavelength for which data for the refractive index and/or the extinction coefficient is provided can include the optical range, i.e., the range from 400 nm to 800 nm, and may additionally include an ultraviolet range and/or an infrared range. An exemplary ultraviolet range for which data for the refractive index and/or the extinction coefficient can be provided may include a wavelength range from 180 nm to 400 nm. An exemplary infrared range for which data for the refractive index and/or the extinction coefficient can be provided may include a wavelength range from 800 nm to 1,200 nm.

The database includes refractive index curves and extinction coefficient curves for a plurality of materials that are present in a physical structure of a stack of material layers on which scatterometry is to be employed for thickness measurement. The database can include a library in which the refractive index curves and the extinction coefficient curves are organized for each corresponding material layer.

Referring to step 200, prior to, concurrently with, or after performing step 100, optical data is collected from a specimen of a stack of material layers employing scatterometry. The scatterometry can be ellipsometry, reflectometry, varying angle scatterometry, or any other type of scatterometry currently know or to be developed in the future. Collection of the optical data can be performed by a measurement tool configured to measure at least one optical spectrum from a stack of material layers, and can be any tool configured to perform ellipsometry, reflectometry, varying angle scatterometry, or any other type of scatterometry.

Specifically, at least one optical spectrum is measured from the specimen of the stack of material layers through scatterometry. As used herein, an "optical spectrum" refers to a data set representing the intensity of measured beam scattered off an object relative to the intensity of an incident beam that impinges on the object as a function of a wavelength that varies within a wavelength range selected from the combined wavelength ranges of ultraviolet radiation, visible light, and infrared radiation. As used herein, ultraviolet radiation refers to any radiation within a wavelength range from 10 nm to 400 nm, visible light refers to any radiation with a wavelength range from 400 nm to 800 nm, and infrared radiation refers to any radiation within a wavelength range from 800 nm to 1 mm. The format of the at least one optical spectrum can be converted as needed to generate data, which is herein referred to as optical data and represents the at least one measured optical spectrum.

Figure 2:
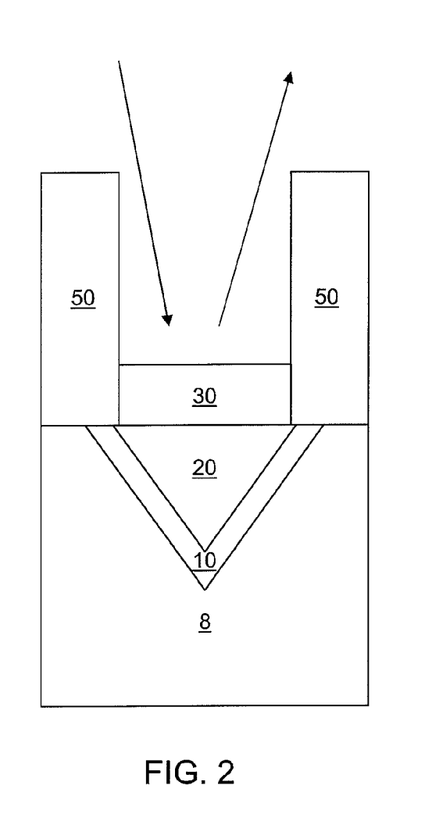
FIG. 2 is a schematic representation of an exemplary film stack formed in a diamond-shaped filled recess on a substrate.

The stack of material layers can be any stack of material layers known in the art. Referring to FIG. 2, an exemplary stack of material layers is illustrated in a vertical cross-sectional view. The exemplary stack of material layers includes, from bottom to top, a substrate 8, a first material layer 10, a second material layer 20, and a third material layer 30. At least one overlying material structures 50 may be optionally provided above the substrate 8. The exemplary stack of material layers may be a stack of planar material layers in which each material layer has a same thickness throughout, or may be a three-dimensional structure in which at least one material layer is non-planar and/or have a laterally varying thickness. In an illustrative example, the substrate 8 can include single crystalline silicon, the first material layer 10 can include a first silicon germanium alloy having a first atomic concentration of germanium, the second material layer 20 can include a second silicon germanium alloy having a second atomic concentration of germanium, and the third material layer 30 can include a third silicon germanium alloy having a third atomic concentration of germanium. Each of the first, second, and third atomic concentrations can be in a range from 15% to 40%. The compositions of the first, second, and third material layers (10, 20, 30) can be different from one another by the atomic percentage of germanium in the silicon germanium alloys. The overlying material structures 50 may be, for example, gate stacks including gate dielectrics, gate conductors, gate cap dielectric material portions, and/or dielectric gate spacers as known in the art.

A computing device can be employed for the purpose of performing various steps of the present disclosure. The computing device includes one or more processors in communication with a memory and configured to run an automated program. The automated program can include various steps according to various embodiments of the present disclosure.

In one embodiment, the automated program can control performance of step 200. Subsequently, the automated program can control performance of step 300 and/or performance of step 400.

Data representing the at least one measured spectrum is transmitted to the computing device that runs the automated program. The automated program can include a step for generating, upon receipt of data representing the at least one measured optical spectrum, a material stack model that approximates the stack of material layers. The generation, or construction, of the material stack model can be performed employing the database provided at step 100, which includes refractive index curves and extinction coefficient curves for a plurality of materials that include the materials within the stack of material layers.

Known parameters may be provided as an input for the material stack model. Known parameters may be, for example, the total thickness of the stack of material layers, or a known thickness of one or more of the material layers within the stack of material layers.

In one embodiment, the material stack model may include planar material layers having uniform thickness throughout. In one embodiment, the material stack model can be a three-dimensional model in which at least one material layer has a non-uniform thickness.

For each material layer within the material stack model, the refractive index curve and the extinction coefficient curve for the material within the material layer is obtained from the library in the database, and is incorporated into the material stack model.

Figure 3:
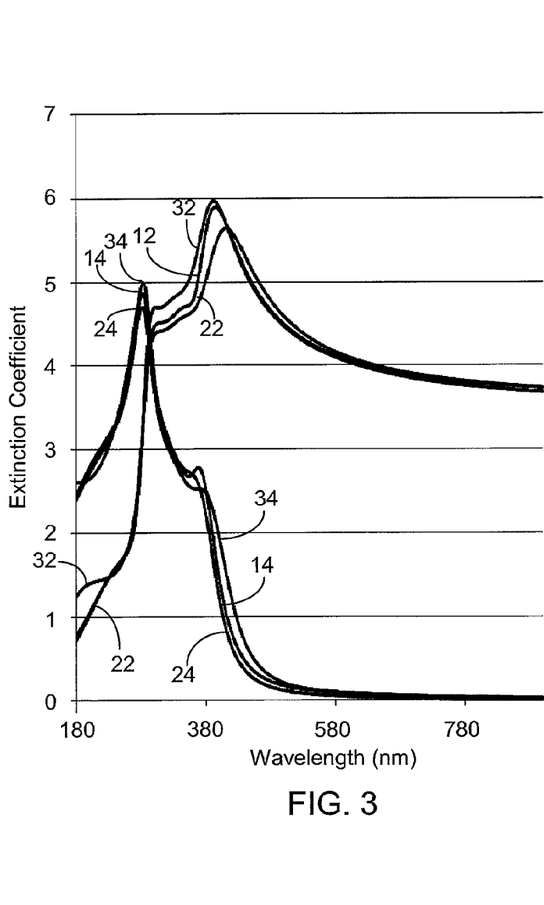
FIG. 3 is an exemplary set of refractive index curves and extinction coefficient curves for the material layers in the exemplary film stack illustrated in FIG. 2.

FIG. 3 illustrates an exemplary set of refractive index curves and extinction coefficient curves for the material layers in the exemplary stack of material layers illustrated in FIG. 2. A first refractive index curve 12 and a first extinction coefficient curve 14 correspond to the material of the first material layer 10. A second refractive index curve 22 and a second extinction coefficient curve 24 correspond to the material of the second material layer 20. A third refractive index curve 12 and a third extinction coefficient curve 14 correspond to the material of the third material layer 30. Another refractive index curve (not shown) and another extinction coefficient curve (not shown) corresponding to the material of the substrate 8 may be employed for the material stack model.

A target material is selected on which a method of extinction coefficient modulation is to be employed. The target material may be any material within the material stack model. For example, in the exemplary stack of material layers illustrated in FIG. 2, the target material can be the material of the substrate 8, the material of the first material layer 10, the material of the second material layer 20, or the material of the third material layer 30. In one embodiment, the target material may be selected based on initially estimated thicknesses of the material layers in the material stack model. In one embodiment, the target material may be selected to be the material of a thickest material layer among material layers having unknown thicknesses. In another embodiment, the target material may be selected to be the material of a thinnest material layer among the material layers having unknown thicknesses. The material layer including the target material is herein referred to as a target material layer.

Once the target material and the corresponding target material layer are selected in the material stack model, a plurality of modulated extinction coefficient curves are generated by scaling the extinction coefficient curve, as acquired from the database, of the target material within the material stack model. The scaling of the extinction coefficient curve of the target material is performed through multiplication of a plurality of scalars to the extinction coefficient curve. Each value of the plurality of scalars is a multiplication constant that is multiplied to the extinction coefficient curve provided from the database to generate one of the plurality of modulated extinction coefficient curves.

Figure 4:
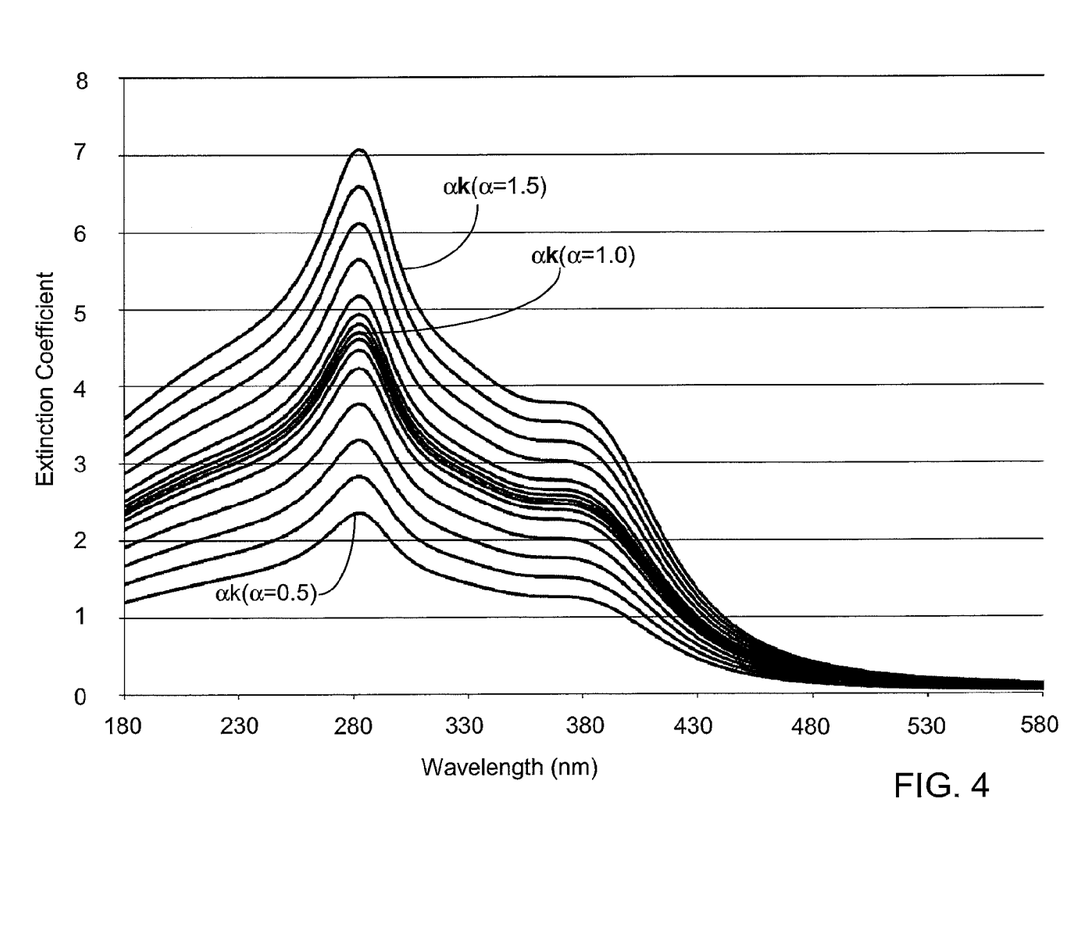
FIG. 4 illustrates modulated extinction coefficient curves according to an embodiment of the present disclosure.

Generation of a plurality of modulated extinction coefficient curves is illustrated in FIG. 4. An extinction coefficient curve as provided from the database is labeled as $\alpha k(\alpha=1.0)$, which means the product of a scalar $\alpha$ and the extinction coefficient curve k at a condition in which the value of the scalar $\alpha$ is equal to 1, i.e., unmodified from the extinction coefficient curve k as provided from the database. In general, each of the plurality of modulated extinction coefficient curves can be expressed as $\alpha k$ in which the value of the scalar $\alpha$ is a real number. A set of discrete values is provided for the values of $\alpha$ to generate the plurality of modulated extinction coefficient curves $\alpha k$.

The values of $\alpha$ for the plurality of modulated extinction coefficient curves $\alpha k$ illustrated in FIG. 4 are, from the bottommost modulated extinction coefficient curve $\alpha k$ to the topmost modulated extinction coefficient curve $\alpha k$: 0.5, 0.6, 0.7, 0.8, 0.9, 0.95, 0.98, 1.0, 1.02, 1.05, 1.1, 1.2, 1.3, 1.4, and 1.5. A specific modulated extinction coefficient curve $\alpha k$ for which the value of scalar $\alpha$ is $\alpha 1$ can be expressed as $\alpha k(\alpha=\alpha 1)$.

The range of values for the plurality of scalars $\alpha$ to be multiplied to the extinction coefficient curve k as provided by the database can be selected such that a fitting algorithm to be employed to determine the thicknesses of various layers in the material stack model can generate convergent solutions to the problem of fitting the measured at least one optical spectrum. Alternatively, the plurality of scalars $\alpha$ to be multiplied to the extinction coefficient curve k as provided by the database can be selected without regard to the generation of convergent solutions by employing a guesswork with the understanding that the values for the scalars $\alpha$ (and the corresponding modulated extinction coefficient curve $\alpha k$) that do not generate convergent solutions can be subsequently discarded.

In one embodiment, the plurality of scalars $\alpha$ can include at least one real number greater than 1. A range of the values greater than 1 for the scalar $\alpha$ corresponds to a modified a modified material stack model in which the target material is replaced with a hypothetical material having a greater extinction coefficient. In another embodiment, the plurality of scalars $\alpha$ can include at least one real number between 0 and 1, 1, and/or at least one real number greater than 1. A range of the values between 0 and 1 for the scalar $\alpha$ corresponds to a modified a modified material stack model in which the target material is replaced with a hypothetical material having a lesser extinction coefficient. In yet another embodiment, the plurality of scalars $\alpha$ can include at least one real number less than 0. A range of the values less than 0 for the scalar $\alpha$ corresponds to a modified a modified material stack model in which the target material is replaced with a hypothetical material that becomes luminescent upon irradiation. In still another embodiment, the plurality of scalars $\alpha$ can include a value of 0. A value of 0 for the scalar $\alpha$ corresponds to a modified a modified material stack model in which the target material is replaced with a hypothetical material that becomes optically transparent. It is noted that existence or non-existence of a physical material having the same extinction coefficient curve as the modulated extinction coefficient curve is irrelevant for the purpose of the present disclosure because mathematical fitting algorithms can be run even on models including a hypothetical material.

Further, any combination of ranges for the values of the scalar α can be employed. In one embodiment, the plurality of scalars α can include at least one real number greater than 1, and/or 1, and/or at least one real number between 0 and 1, and/or 0, and/or negative real numbers.

The plurality of modulated extinction coefficient curve αk can be indexed. For example, an integer index i can be employed. If the total number of the modulated extinction coefficient curve αk is a positive integer N greater than 1, the integer index i can range from 1 to N corresponding to each of the N indexed modulated extinction coefficient curve αk.

Each of the plurality of modulated extinction coefficient curve αk is sequentially selected. The sequential selection of the plurality of modulated extinction coefficient curve αk may be performed employing the integer index i, for example, by sequentially selecting the plurality of modulated extinction coefficient curve αk in the increasing order or decreasing order of the value of the integer index i.

For each selected modulated extinction coefficient curve αk among the plurality of modulated extinction coefficient curves, the modified material stack model is fitted with the at least one measured optical spectrum. Fitting the modified material stack model with the at least one measured optical spectrum can be performed by determining unknown parameters of the modified material stack model through the step of running a fitting program that determines estimated values of the unknown parameters as variables of the fitting program. The running of the fitting program can be controlled by the automated program. The fitting program can be run until a difference metric between a calculated optical spectrum from the modified material stack model and the at least one measured optical spectrum is minimized. The difference metric can be, for example, a root-mean-square difference between the calculated optical spectrum and the at least one measured optical spectrum. The unknown parameters include the thickness of at least one material layer among the modified material stack. Specifically, the unknown parameters can include the thickness of a material layer among the material layers within the modified material stack model, which is herein referred to as thickness-fitting material layer.

Each modified material stack model is derived from the material stack model by substitution of the selected modulated extinction coefficient curve for the extinction coefficient curve. In other words, the i-th modified material stack model can be derived from the material stack model by substitution of the i-th modulated extinction coefficient curve αk(α=αi) for the extinction coefficient curve k. For each modified material stack model employing an i-th modulated extinction coefficient curve αk in which the value of i varies from 1 to N, an i-th data set representing an estimated thickness of the thickness-fitting material layer in the modified material stack model is generated by the fitting of the i-th modified material stack model with the at least one optical spectrum.

In one embodiment, the thickness-fitting material layer, i.e., the material layer of which the thickness is fitted with the various modified material stack models, can be the same as the target material layer, i.e., include the target material.

In another embodiment, the thickness-fitting material layer, i.e., the material layer of which the thickness is fitted with the various modified material stack models, can be different from the target material layer, i.e., include a material other than the target material.

A range of the values greater than 1 for the scalar α corresponds to a material stack model in which the target material is replaced with a hypothetical optically denser material. Less of the hypothetical optically denser material absorbs the same amount of light as the target material layer in the physical structure. Thus, the fitting thickness, i.e., the thickness obtained by fitting, of the hypothetical optically denser material employing the modified material stack model, is less than the fitting thickness of the target material layer obtained by fitting the material stack model. The deviation of the fitting thickness is particularly useful for larger dimensions for the purpose of breaking a parameter correlation.

A range of the values between 0 and 1 for the scalar α corresponds to a material stack model in which the target material is replaced with a hypothetical optically less dense material. More of the hypothetical optically denser material is needed to absorb the same amount of light as the target material layer in the physical structure. Thus, the fitting thickness of the hypothetical optically less dense material employing the modified material stack model is greater than the fitting thickness of the target material layer obtained by fitting the material stack model. The deviation of the fitting thickness is particularly useful for small dimensions below the resolution limit imposed by conventional material stack models.

A range of the values less than 0 for the scalar α corresponds to a material stack model in which the target material is replaced with a hypothetical optically active material that emits more light upon irradiation. The values less than 0 results in an unphysical, yet analytically continuous, regime of the extinction coefficient curve. The analytical regime in which the value of the scalar α is less than 0 is herein referred to as an "activation region" since a hypothetical material that substitutes the target material produces light rather than absorbing the light as it the hypothetical material were an active medium in a laser operation. The deviation of the fitting thickness is particularly useful for optically weak materials with very low extinction coefficient such as silicon nitride, silicon oxide, silicon oxynitride, and organosilicate glasses.

Only the extinction coefficient curve is changed in each of the modified material stack models, while the refractive index curve remains unchanged in order to prevent phase changes in the fitting programs that may result in additional complexities in fitting due to a phenomenon of momentum coupling.

For each i-th modified material stack model employing the i-th modulated extinction coefficient curve, an i-th data set is generated, which represents the result of the fitting between the calculated optical spectrum generated from the i-th modified material stack model and the at least one measured optical spectrum. In one embodiment, each i-th data set can include a calculated thickness range for the thickness-fitting material layer as estimated employing the i-th modified material stack model. Each calculated thickness range can be generated, for example, employing the automated program that controls the fitting of each calculated optical spectrum to the at least one measured optical spectrum, for each of the modified material stack models. Each calculated thickness range can define a nominal calculated thickness, a lower estimate of the calculated thickness, and/or an upper estimate of the calculated thickness for the thickness-fitting material layer in each of the modified material stack models. Each calculated thickness range may be defined by probability estimates, for example, employing a Gaussian function representing an estimated probability that the fitting between a calculated optical spectrum and the at least one measured optical spectrum can be considered a match. For example, each calculated thickness range may be defined by the center value for the thickness of the thickness-fitting material layer and the standard deviation (or a predefined multiples of the standard deviation) for the thickness of the thickness-fitting material layer as defined by the Gaussian function.

In general, the degree of correlation and parameter insensitivity changes as the values of the scalar α changes in the various modified material stack models corresponding to the various values of the index parameter i. Thus, some among the modified material stack models can have a relatively large degree of correlation and/or a relatively large degree of parameter insensitivity, while some others among the modified material stack models can have a smaller degree of correlation and/or a smaller degree of parameter insensitivity. Correspondingly, some of the modified material stack models can make it difficult to estimate the fitting thickness or provide a fitting thickness with a relatively large fitting error, while some others of the modified material stack models can enable estimation of the fitting thickness with a high degree of accuracy, i.e., with a smaller fitting error. The fitting error can be any of the metrics known in the art for estimating goodness of fit between a calculated optical spectrum from the modified material stack model and the at least one measured optical spectrum.

Figure 5:
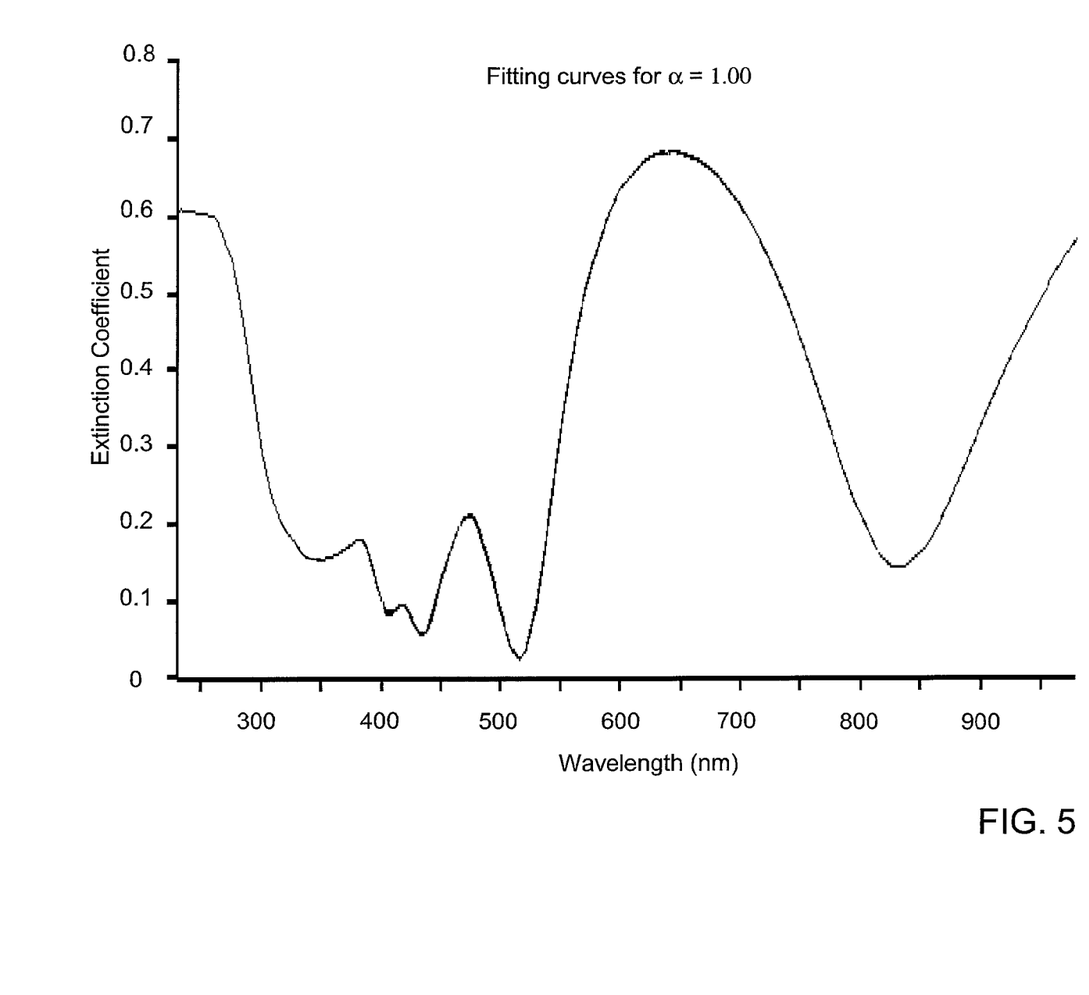
FIG. 5 illustrates a variation of fitting curves for a given range of variations in thickness when a scalar for extinction coefficient modulation is 1.00 according to an embodiment of the present disclosure.

Referring FIG. 5, a variation of fitting curves for a given range of variations in thickness is shown when the scalar α for extinction coefficient modulation is 1.00, i.e., when the extinction coefficient curve as provided from the database is employed in a material stack model. The material stack model, which can be viewed as a special case of the modified material stack models in which the value of the scalar α is 1.0, has a relatively large degree of correlation and a relatively large degree of parameter insensitivity so that the calculated range of the thickness-fitting material layer is relatively large, i.e., the calculated thickness range of the thickness-fitting material layer is wide, and any calculated thickness of the thickness-fitting material layer includes a large uncertainty.

Figure 6:
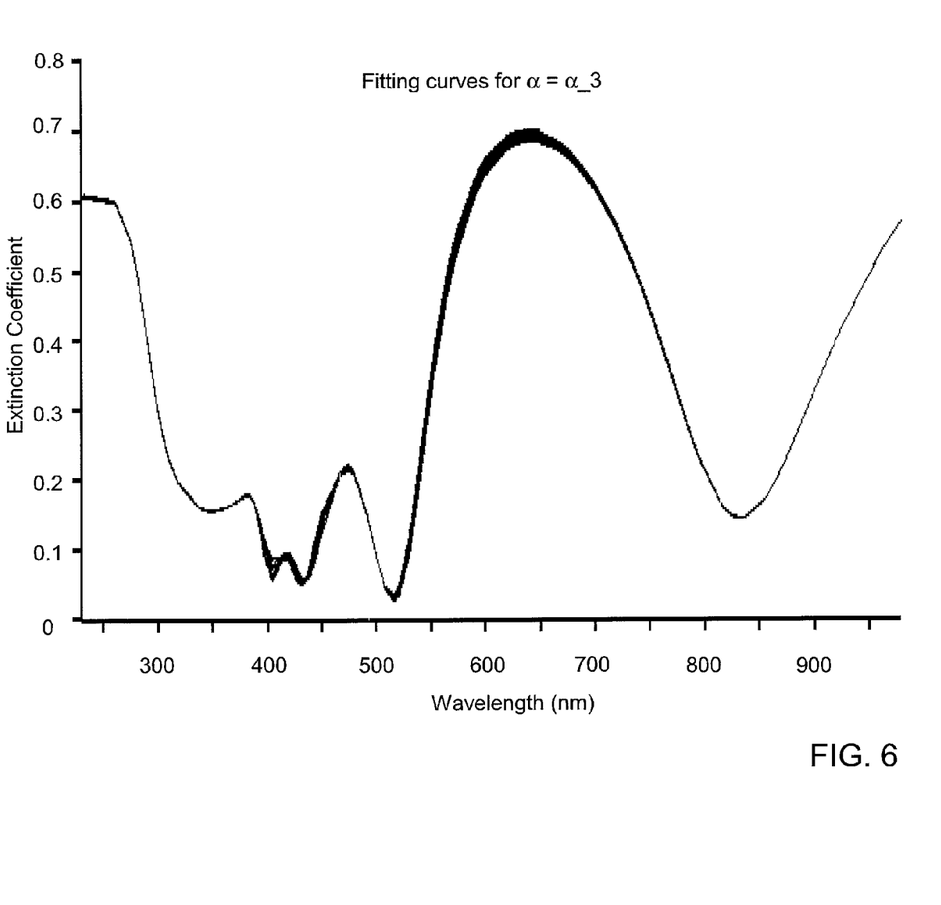
FIG. 6 illustrates a variation of fitting curves for a given range of variations in thickness when the scalar for extinction coefficient modulation has a value not equal to 1.00 according to an embodiment of the present disclosure.

Referring FIG. 6, a variation of fitting curves for a given range of variations in thickness is shown when the scalar α for extinction coefficient modulation is $α\_3$, which is greater than 1.0, i.e., when a modulated extinction coefficient curve derived from the extinction coefficient curve from the database by multiplication with the value $α\_3$, is employed in the modified material stack model. The modified material stack model has a smaller degree of correlation and a smaller degree of parameter insensitivity so that the calculated range of the thickness-fitting material layer is small, i.e., the calculated thickness range of the thickness-fitting material layer is narrow, and a calculated thickness range of the thickness-fitting material layer has a small uncertainty.

Referring to step 400 of FIG. 1, the film thickness for the thickness-fitting material layer can be determined by fitting the N data sets with a fitting curve. In one embodiment, the film thickness for the thickness-fitting material layer can be determined by fitting the calculated thickness ranges with a fitting curve. The scalar α is employed as an independent variable of the fitting curve, which represents a variation of the thickness-fitting material layer as a function of the scalar α.

A best-fit function is determined by fitting the N data sets, which may include the calculated thickness ranges, with a fitting function while employing the plurality of scalars α as discrete values for the independent variable of the fitting function. As used herein, a "best-fit function" refers to a function that provides the best fit among a class of fitting curves modulated by one or more fitting parameters. The best-fit function may be a linear function of the scalar α, a quadratic function of the scalar α, any other polynomial of the scalar α, or any other analytic function known in the art.

The physical thickness of the thickness-fitting material layer can be estimated by selecting a value of the best-fit function corresponding to a value of 1 of the independent variable, which is the scalar α. The physical thickness as derived from the best-fit function as a function of the scalar α is herein referred to as a fitting-derived thickness. In one embodiment, the automated program provide the step of calculating a measure of uncertainty in the estimated physical thickness from a measure of fitting errors of the best-fit function with respect to the N data sets.

Figure 7:
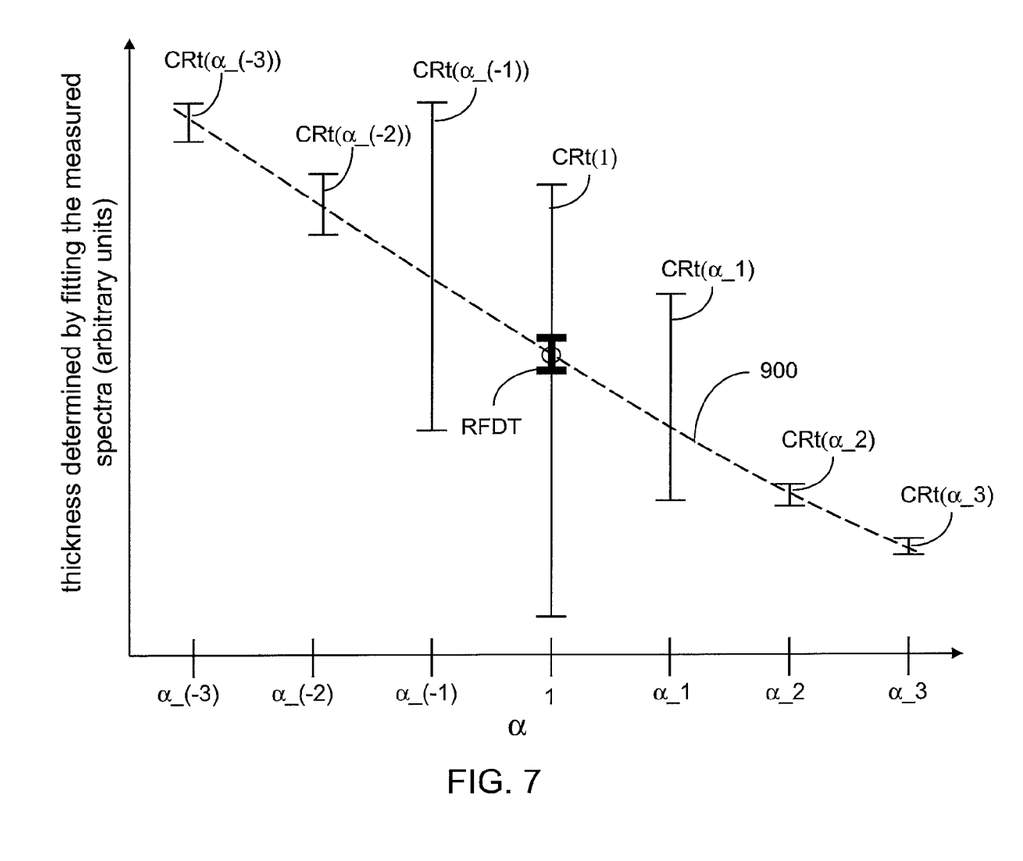
FIG. 7 illustrates a first exemplary fitting method for estimating a range of a fitting-derived thickness for a material layer in a material stack according to an embodiment of the present disclosure.

Referring to FIG. 7, a first exemplary fitting method for estimating a range of a fitting-derived thickness for a material layer, i.e., a thickness-fitting material layer, in a material stack is illustrated. Seven discrete values for the scalar α are employed in this fitting as a function of the independent variable of the scalar α. The seven discrete values include: $α\_(-3), α\_(-2), α\_(-1), 1, α\_1, α\_2$, and $α\_3$. The corresponding calculated thickness ranges are: $CRt(α\_(-3))$, $CRt(α(-2))$, $CRt(α\_(-1))$, $CRt(1)$, $CRt(α\_1)$, $CRt(α\_2)$, and $CRt(α\_3)$, respectively. A best-fit function 900 can be generated from the calculated thickness ranges, or by any other means of statistically reflecting the seven data sets generated by fitting seven calculated optical spectrum from modified material stack models to the at least one measured optical spectrum.

The physical thickness of the thickness-fitting material layer can be estimated by selecting a value of the best-fit function 900 corresponding to a value of 1 of the independent variable, which is the scalar α. The automated program can provide the step of calculating a measure of uncertainty in the estimated physical thickness from a measure of fitting errors of the best-fit function with respect to the seven data sets. In this case, a range of fitting-derived thickness RFDR can be estimated from the goodness of fit of the best-fit function 900 with the seven data sets, or with the seven calculated thickness ranges.

Figure 8:
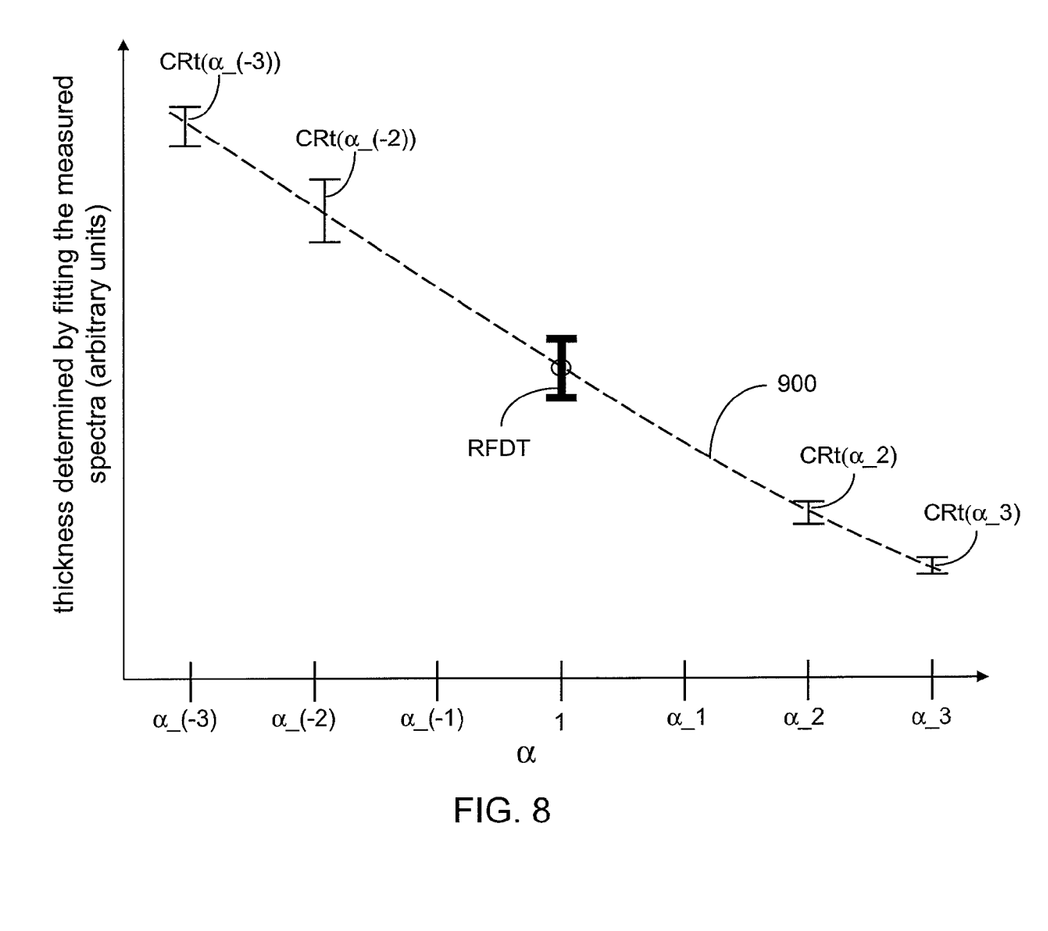
FIG. 8 illustrates a second exemplary fitting method for estimating a range of a fitting-derived thickness for a material layer in a material stack according to an embodiment of the present disclosure.

Referring to FIG. 8, a second exemplary fitting method for estimating a range of a fitting-derived thickness for a thickness-fitting material layer in a material stack is illustrated. Seven discrete values for the scalar α are employed in this fitting as a function of the independent variable of the scalar α. The seven discrete values include: $α\_(-3), α\_(-2), α\_(-1)$, 1, $α\_1, α\_2$, and $α\_3$. Fitting of the calculated optical spectrum with the at least one measured optical spectrum may provide unreliable estimation of a calculated thinness range for the thickness-fitting material layer for some of the discrete values of the scalar α such as $α\_(-1)$, 1, and $α\_1$. A best-fit function 900 can be generated from reliable calculated thickness ranges, i.e., from $CRt(α\_(-3))$, $CRt(α\_(-2))$, $CRt(α\_2)$, and $CRt(α\_3)$, or by any other means of statistically reflecting four data sets generated by fitting the four calculated optical spectrum from modified material stack models to the at least one measured optical spectrum.

The physical thickness of the thickness-fitting material layer can be estimated by selecting a value of the best-fit function 900 corresponding to a value of 1 of the independent variable, which is the scalar α. In this case, the step of selecting the value of the best-fit function corresponding to the value of 1 of the variable can be performed by interpolation of the best-fit function 900. The automated program can provide the step of calculating a measure of uncertainty in the estimated physical thickness from a measure of fitting errors of the best-fit function with respect to the four data sets. In this case, a range of fitting-derived thickness RFDR can be estimated from the goodness of fit of the best-fit function 900 with the four data sets, or with the four calculated thickness ranges.

Figure 9:
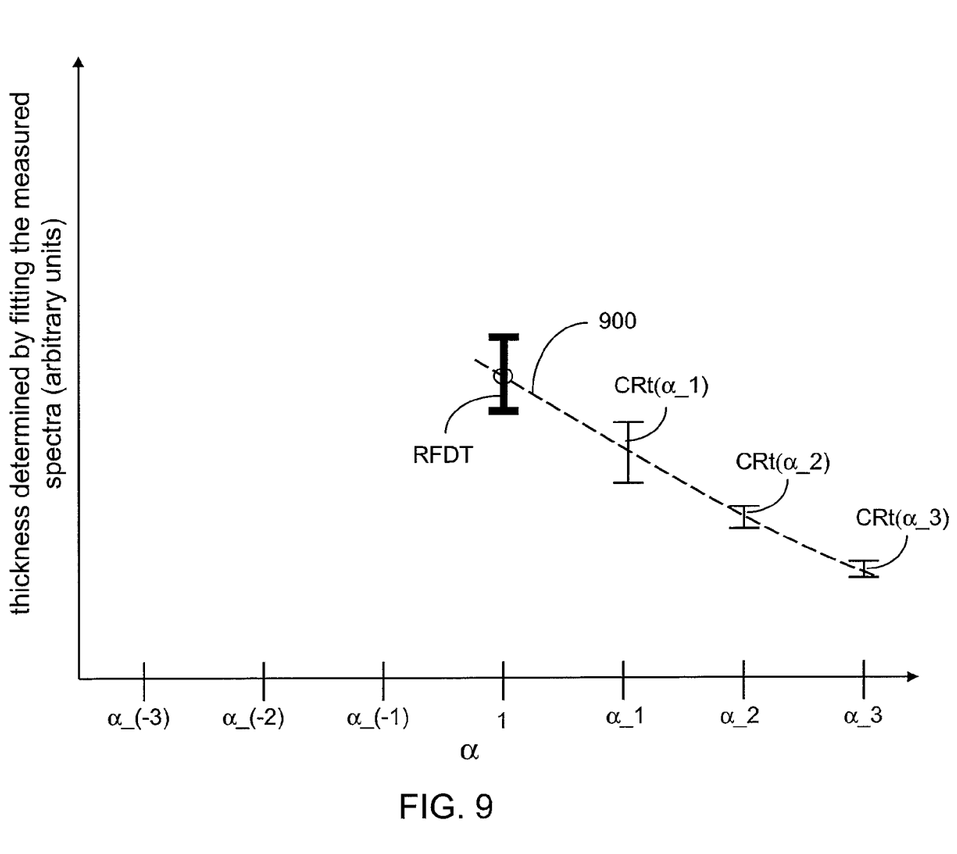
FIG. 9 illustrates a third exemplary fitting method for estimating a range of a fitting-derived thickness for a material layer in a material stack according to an embodiment of the present disclosure.

Referring to FIG. 9, a third exemplary fitting method for estimating a range of a fitting-derived thickness for a thickness-fitting material layer in a material stack is illustrated.

Seven discrete values for the scalar α are employed in this fitting as a function of the independent variable of the scalar α. The seven discrete values include: $\alpha\_(-3), \alpha\_(-2), \alpha\_(-1)$, 1, $\alpha\_1, \alpha\_2$, and $\alpha\_3$. Fitting of the calculated optical spectrum with the at least one measured optical spectrum may provide unreliable estimation of a calculated thinness range for the thickness-fitting material layer for some of the discrete values of the scalar α such as $\alpha\_(-3), \alpha\_(-2), \alpha\_(-1)$, and 1. A best-fit function 900 can be generated from reliable calculated thickness ranges, i.e., from $CRt(\alpha\_1), CRt(\alpha\_2)$, and $CRt(\alpha\_1)$, or by any other means of statistically reflecting four data sets generated by fitting the three calculated optical spectrum from modified material stack models to the at least one measured optical spectrum.

The physical thickness of the thickness-fitting material layer can be estimated by selecting a value of the best-fit function 900 corresponding to a value of 1 of the independent variable, which is the scalar α. In this case, the step of selecting the value of the best-fit function corresponding to the value of 1 of the variable can be performed by extrapolation of the best-fit function 900. The automated program can provide the step of calculating a measure of uncertainty in the estimated physical thickness from a measure of fitting errors of the best-fit function with respect to the three data sets. In this case, a range of fitting-derived thickness RFDR can be estimated from the goodness of fit of the best-fit function 900 with the three data sets, or with the three calculated thickness ranges.

Figure 10:
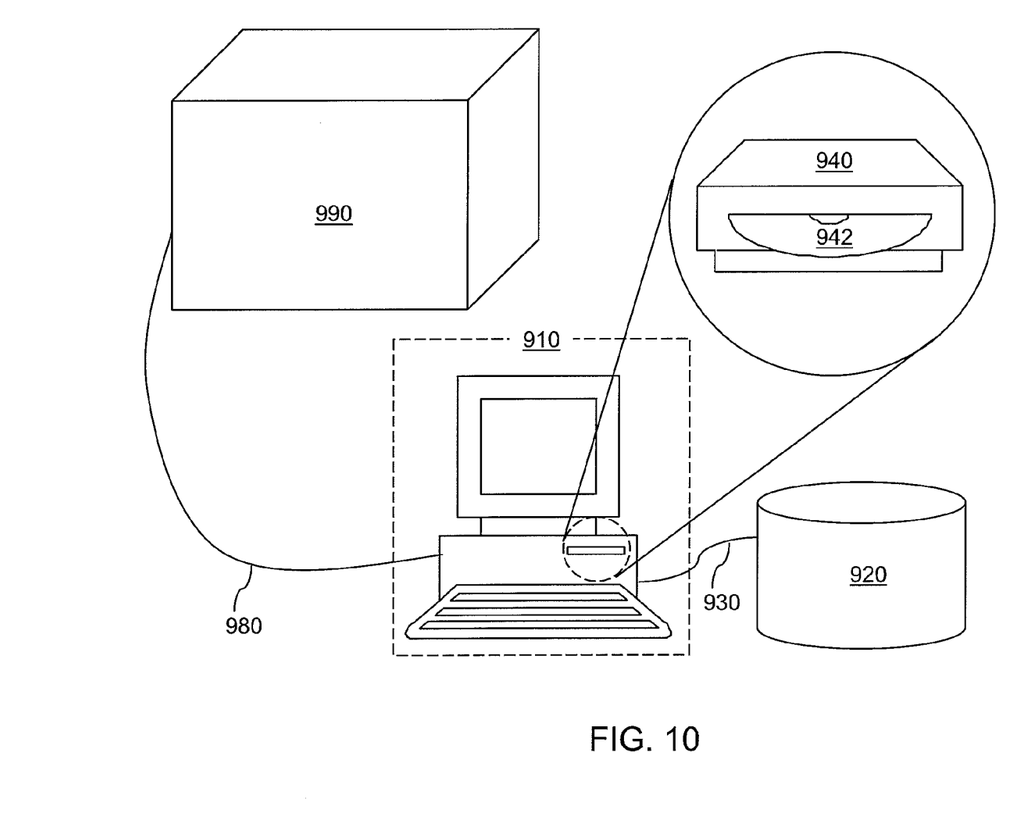
FIG. 10 illustrates an exemplary apparatus that can be employed to implement the methods of various embodiments of the present disclosure.

Referring to FIG. 10, an exemplary apparatus is illustrated, which can be employed to implement the methods of various embodiments of the present disclosure. The apparatus can be configured to perform at least one and/or any of the steps in the flow chart in FIG. 1 in an automated step by running an automated program on any computing device known in the art. The apparatus including one or more processors in communication with a memory and configured to run an automated program. The apparatus can be employed to measure a thickness of a material layer in a material stack through a combination of at least one optical measurement and running of a modeling program that estimates the thickness of the material layer, i.e., the thickness-fitting material layer.

The apparatus includes a measurement tool 990 configured to measure at least one optical spectrum from a stack of material layers. The apparatus further includes a computing device 910 including one or more processors in communication with a memory and configured to run an automated program. A data link 980 is provided between the measurement tool 990 and the computing device. The data link 980 can be a wire connection, or can be a wireless connection.

The automated program can include any, or all, of the steps of: (1) generating, upon receipt of data representing the at least one measured optical spectrum, a material stack model that approximates the stack of material layers employing a database including refractive index curves and extinction coefficient curves for a plurality of materials; (2) generating a plurality of modulated extinction coefficient curves by scaling an extinction coefficient curve, as acquired from the database, of a target material within the material stack model through multiplication of a plurality of scalars; (3) generating, for each selected modulated extinction coefficient curve among the plurality of modulated extinction coefficient curves, a data set representing an estimated thickness of one of the material layers by fitting a modified material stack model with the at least one measured optical spectrum, wherein the modified material stack model is derived from the material stack model by substitution of the selected modulated extinction coefficient curve for the extinction coefficient curve; (4) determining a best-fit function by fitting the data sets with a fitting function while employing the plurality of scalars as discrete values for a variable of the fitting function; and (5) estimating a physical thickness of the one of the material layers by selecting a value of the best-fit function corresponding to a value of 1 of the variable.

In one embodiment, the apparatus can include computing device 910 including one or more processor units that are in communication with a memory. The computing device 910 can include a computer as known in the art. The computing device 910 can be in communication with a database 920, which can be a standalone computing device or can be incorporated into the computing device 910. The database can store the library of refractive index curves and extinction coefficient curves for each material in the stack of material layers. If the database 920 is a standalone computing device, a data cable 930 or wireless communication can be employed to transfer data between the database 920 and the computing device 910. The database can store information on reticle shapes, illuminator shapes, and various parameters of a lithographic illumination system.

The computing device 910 can be employed to perform at least one or all of the steps described above with, or without, human intervention depending on the program that runs thereupon. The automated program can be stored, i.e., embodied, in at least one non-transitory machine-readable data storage medium that can be provided within the computing device 910 and/or within at least one non-transitory machine-readable data storage medium provided within the database 920. The non-transitory machine-readable data storage medium may be of any type known in the art.

One or more non-transitory machine readable medium within the computing device 910 and/or the database 920 can be a portable non-transitory machine-readable data storage medium 942 such as a CD ROM or a DVD ROM. A data-reading device 940 may be provided in the computing device 910 or within the database 920 to enable reading of the automated program in case the automated program is embodied in the portable non-transitory machine-readable data storage medium 942.

While the present disclosure has been described in terms of specific embodiments, it is evident in view of the foregoing description that numerous alternatives, modifications and variations will be apparent to those skilled in the art. Each of the various embodiments of the present disclosure can be implemented alone, or in combination with any other embodiments of the present disclosure unless expressly disclosed otherwise or otherwise impossible as would be known to one of ordinary skill in the art. Accordingly, the present disclosure is intended to encompass all such alternatives, modifications and variations which fall within the scope and spirit of the present disclosure and the following claims.

What is claimed is:

1. A method of measuring a dimension of a material layer in a material stack, said method comprising:
    measuring at least one optical spectrum from a stack of material layers;
    generating a material stack model that approximates said stack of material layers from a database that includes refractive index curves and extinction coefficient curves for a plurality of materials;
    generating a plurality of modulated extinction coefficient curves by scaling an extinction coefficient curve, as acquired from said database, of a target material within said material stack model through multiplication of a plurality of scalars;

generating, for each selected modulated extinction coefficient curve among said plurality of modulated extinction coefficient curves, a data set representing an estimated thickness of one of said material layers by fitting a modified material stack model with said at least one measured optical spectrum, wherein said modified material stack model is derived from said material stack model by substitution of said selected modulated extinction coefficient curve for said extinction coefficient curve;

determining a best-fit function by fitting said data sets with a fitting function while employing said plurality of scalars as discrete values for a variable of said fitting function;

estimating a physical thickness of said one of said material layers by selecting a value of said best-fit function corresponding to a value of 1 of said variable; and outputting said estimated physical thickness of said one of said material layers as an approximation of a true physical thickness of said one of said material layer by storing in a non-transitory machine-readable data storage medium, or by displaying in a human-perceptible format, said estimated physical thickness of said one of said material layers.

2. The method of claim 1, further comprising calculating a measure of uncertainty in said estimated physical thickness from a measure of fitting errors of said best-fit function with respect to said data sets.

3. The method of claim 1, wherein said one of said material layers includes said target material.

4. The method of claim 1, wherein said one of said material layers includes a material other than said target material.

5. The method of claim 1, wherein said plurality of scalars includes at least one real number greater than 1.

6. The method of claim 1, wherein said plurality of scalars includes at least one real number between 0 and 1.

7. The method of claim 1, wherein said plurality of scalars includes at least one real number less than 0.

8. The method of claim 1, wherein said selecting of said value of said best-fit function corresponding to said value of 1 of said variable is performed by interpolation of said best-fit function.

9. The method of claim 1, wherein said selecting of said value of said best-fit function corresponding to said value of 1 of said variable is performed by extrapolation of said best-fit function.

10. The method of claim 1, wherein said material stack model is a three-dimensional model in which at least one material layer has a non-uniform thickness.

11. An apparatus for measuring a thickness of a material layer in a material stack, said apparatus comprising:

a measurement tool configured to measure at least one optical spectrum from a stack of material layers; and a computing device including one or more processors in communication with a memory and configured to run an automated program, said automated program comprising steps of:

generating, upon receipt of data representing said at least one measured optical spectrum, a material stack model that approximates said stack of material layers from a database that includes refractive index curves and extinction coefficient curves for a plurality of materials;

generating a plurality of modulated extinction coefficient curves by scaling an extinction coefficient curve, as acquired from said database, of a target material within said material stack model through multiplication of a plurality of scalars;

generating, for each selected modulated extinction coefficient curve among said plurality of modulated extinction coefficient curves, a data set representing an estimated thickness of one of said material layers by fitting a modified material stack model with said at least one measured optical spectrum, wherein said modified material stack model is derived from said material stack model by substitution of said selected modulated extinction coefficient curve for said extinction coefficient curve;

determining a best-fit function by fitting said data sets with a fitting function while employing said plurality of scalars as discrete values for a variable of said fitting function;

estimating a physical thickness of said one of said material layers by selecting a value of said best-fit function corresponding to a value of 1 of said variable; and outputting said estimated physical thickness of said one of said material layers as an approximation of a true physical thickness of said one of said material layer by storing in a non-transitory machine-readable data storage medium, or by displaying in a human-perceptible format, said estimated physical thickness of said one of said material layers.

12. The apparatus of claim 11, wherein said automated program further comprises a step of calculating a measure of uncertainty in said estimated physical thickness from a measure of fitting errors of said best-fit function with respect to said data sets.

13. The apparatus of claim 11, wherein said one of said material layers includes said target material.

14. The apparatus of claim 11, wherein said one of said material layers includes a material other than said target material.

15. The apparatus of claim 11, wherein said plurality of scalars includes at least one real number greater than 1.

16. The apparatus of claim 11, wherein said plurality of scalars includes at least one real number between 0 and 1.

17. The apparatus of claim 11, wherein said plurality of scalars includes at least one real number less than 0.

18. The apparatus of claim 11, wherein said step of selecting said value of said best-fit function corresponding to said value of 1 of said variable is performed by interpolation of said best-fit function.

19. The apparatus of claim 11, wherein said step of selecting said value of said best-fit function corresponding to said value of 1 of said variable is performed by extrapolation of said best-fit function.

20. The apparatus of claim 11, wherein said material stack model is a three-dimensional model in which at least one material layer has a non-uniform thickness.

* * * * *